United States Patent [19]

Malin

[11] 4,423,559
[45] Jan. 3, 1984

[54] GOLD DREDGE SUCTION NOZZLE

[76] Inventor: John L. Malin, P.O. Box 186, Shady Cove, Oreg. 97539

[21] Appl. No.: 398,583

[22] Filed: Jul. 15, 1982

[51] Int. Cl.$^3$ .............................................. E02F 3/88
[52] U.S. Cl. ........................................ 37/58; 15/410; 15/415 R
[58] Field of Search .................. 37/58, 61, 62, 63, 56; 15/415 R, 415 A, 410, 414, 420, 344

[56] References Cited

U.S. PATENT DOCUMENTS

| | | | |
|---|---|---|---|
| 371,686 | 10/1887 | Howell | 37/58 |
| 646,490 | 4/1900 | Deery | 15/410 X |
| 1,120,980 | 12/1914 | Schofield | 15/415 X |
| 1,344,205 | 6/1920 | Holdaway et al. | 15/415 X |
| 2,413,561 | 12/1946 | Hehr | 37/62 |
| 2,744,286 | 5/1956 | Carpenter et al. | 15/415 X |
| 3,226,854 | 1/1966 | Mero | 37/58 |
| 4,352,251 | 10/1982 | Sloan | 37/58 |

*Primary Examiner*—Clifford D. Crowder
*Attorney, Agent, or Firm*—Harvey B. Jacobson

[57] ABSTRACT

An elongated tubular member including inlet and outlet end sections is provided and each section includes inlet and outlet ends. The inlet end of the outlet section and the outlet end of the inlet section include coacting structure universally coupling those ends together for limited universal relative angular displacement about infinite axes extending substantially normal to the center axes thereof and for rotational angular displacement of the inlet section about its center axis relative to the outlet section while maintaining a good fluid seal between the universally connected ends of the sections. Handgrip structure is carried by the inlet section and projects laterally outwardly therefrom. The universally connected ends of the sections are coupled together through the utilization of a hollow partial spherical bell terminal end on one of the ends and a hollow partial spherical bulbous terminal end on the other end universally received within the bell terminal end.

1 Claim, 4 Drawing Figures

GOLD DREDGE SUCTION NOZZLE

BACKGROUND OF THE INVENTION

When carrying out small scale suction dredging operations, the support and proper placement of the inlet end of the suction line is important for efficient operation and the inlet end of the suction line is usually manually supported and positioned. Accordingly, a need exists for an effective structure whereby the inlet end of a suction dredging line may be conveniently manually supported and positioned with a minimum of effort.

Various different forms of articulated inlet suction nozzles and other nozzles including structure facilitating proper positioning of the nozzles heretofore have been provided such as those disclosed in U.S. Pat. Nos. 371,686, 399,255, 1,772,547, 1,284,099, 3,429,588 and 4,208,813. However, these previously known structures are not specifically designed for ease of use during a small suction dredging operation of the type wherein the inlet end of the suction dredging line is to be manually supported and positioned.

BRIEF DESCRIPTION OF THE INVENTION

The suction nozzle of the instant invention has been specifically designed for use on the inlet end of a suction dredging line and incorporates inlet and outlet sections which are universally coupled together and provide a convenient handle on the inlet section thereof. The sections of the nozzle may be constructed of various materials including various metals, but it has been found that plastics may be advantageously used in the construction of the nozzle due to the light weight of available high abrasion resistant plastics.

The main object of this invention is to provide a suction nozzle for a section dredge line which may be conveniently manually supported and positioned during a dredging operation.

Another object of this invention is to provide a suction nozzle which may be readily manufactured at a low cost.

Still another object of this invention is to provide a suction nozzles of the articulated type and wherein the inlet end thereof includes a downwardly inclined opening of slightly smaller cross-sectional area than the remainder of the internal cross-sectional diameter of the nozzle.

A final object of this invention to be specifically enumerated herein is to provide a suction dredging nozzle in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
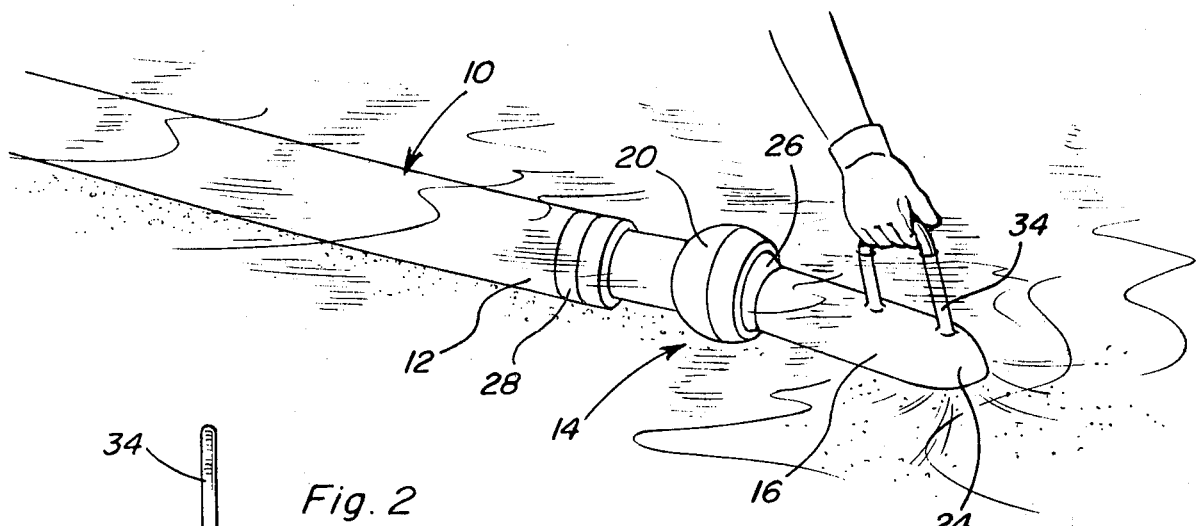
FIG. 1 is a perspective view of the nozzle of the instant invention mounted on the inlet end of a suction dredging line.
Figure 2:
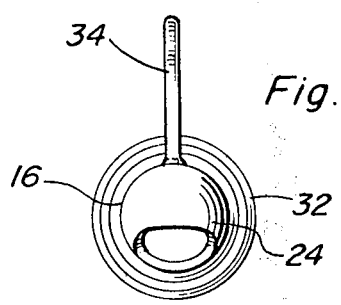
FIG. 2 is an end elevational view of the nozzle.
Figure 3:
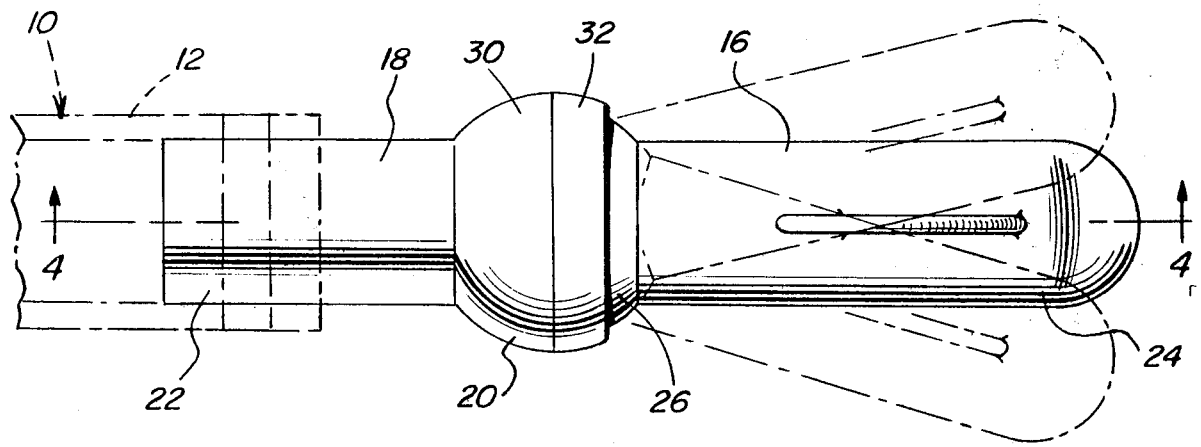
FIG. 3 is an enlarged top plan view of the nozzle with alternate positions of the inlet section thereof being illustrated in phantom lines.

Referring now more specifically to the drawings, the numeral 10 generally designates a suction dredging line 10 including an inlet end 12. The suction nozzle assembly of the instant invention is referred to in general by the reference numeral 14 and includes an inlet end section 16 and an outlet end section 18.

The outlet end section 18 includes an inlet end 20 and outlet end 22 while the inlet end section 16 includes an inlet end 24 and an outlet end 26. The outlet end 22 of the outlet end section 18 is substantially cylindrical and is snugly telescoped within the inlet end 12 of the suction line 10 and secured in position therein by a suitable hose clamp 28. The inlet end of the outlet end section defines a partial spherical bell end including a base section 30 formed integrally with the outlet end section 22 and a band section 32 which may be joined to the base section 30 by thermo welding or sonic welding after the inlet and outlet ends 20 and 26 have been coupled together.

The inlet end 26 comprises a partial spherical bulbous end and may be universally received within the base end section 30 prior to the securement of the band section 32 to the base section 30. After the outlet end 26 has been seated in the base section 30, the band section 32 may be secured in position. In this manner, the inlet end section 16 will be supported from the outlet end section 18 for limited universal angular displacement relative thereto. In addition, the inlet end section 16 is supported from the outlet end section 18 for relative angular displacement about the longitudinal axis of the inlet section 16.

Figure 4:
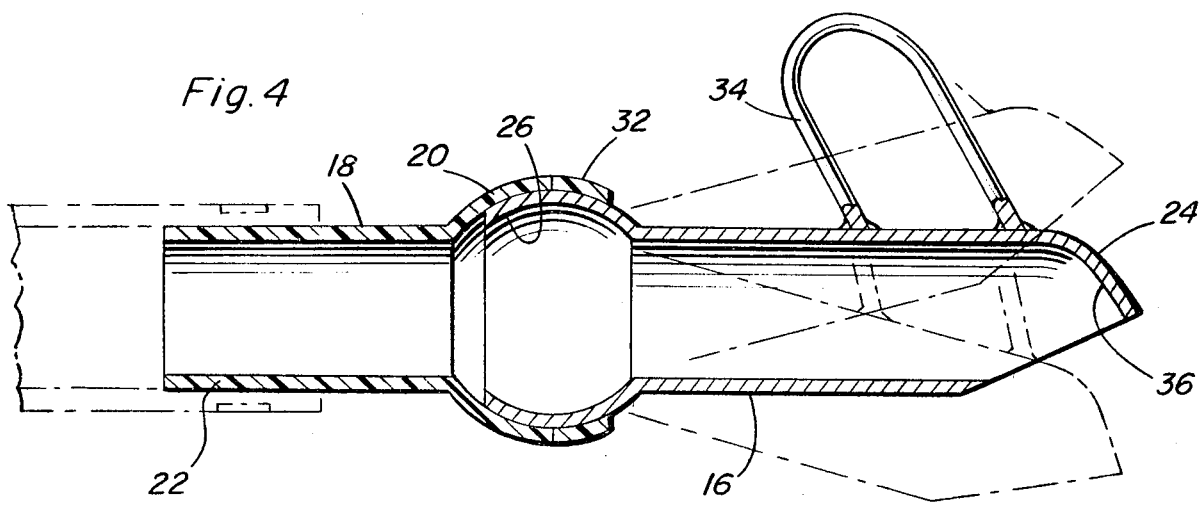
FIG. 4 is a vertical sectional view taken substantially upon the plane indicated by the section line 4—4 of FIG. 3.

From FIGS. 1 and 4 of the drawings, it may be seen that the inlet end section 16 includes a U-shaped handle 34 which opens toward and has its free ends secured to the inlet end 24 of the inlet end section 16 with the handle 34 disposed in a rearwardly and upwardly inclined position relative to the inlet end section 16. Further, from FIG. 4 of the drawings it may be seen that the inlet end 24 is of a shape to define a forwardly and downwardly inclined inlet opening 36 which is of slightly smaller inside cross-sectional diameter than the inside cross-sectional diameter of the remainder of the inlet end section 16.

In operation, after the nozzle assembly 14 has been mounted on the inlet end 12 of the suction line 10, the nozzle assembly 14 may be supported by the handle 34 and readily positioned as desired to effect an efficient suction dredging operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A suction nozzle for the inlet end of a hand supportable suction dredge hose, said nozzle including horizontally elongated inlet and outlet end sections each including inlet and outlet ends, the inlet end of said outlet section and the outlet end of said inlet section being fluid flow communicated with each other and including coacting means universally coupling the fluid flow communicated ends together for limited universal relative angular displacement about infinitive axes extending substantially normal to the center axes of said ends and for rotational angular displacement of said inlet end section about its center axis relative to said outlet end section while maintaining a good fluid seal between said flow communicated ends, and handgrip means carried by said inlet section and projection laterally outwardly therefrom, said outlet end section including a tubular nipple defining outlet end and a partial spherical outwardly flaring inlet end, the outlet end of said inlet end section defining a partial spherical bulbous end universally received in the inlet end of said outlet end section, a band section including a truncated spherical interior joined to the large diameter end of said inlet end of said outlet section captively retaining said bulbous end in said partial spherical inlet end, said handgrip means being carried by said inlet end of said inlet section and comprising an upstanding inverted U-shaped handle rigid with said inlet end section and having its closed upper end outermost, said handle being rearwardly and upwardly inclined toward its closed upper end, said inlet end of said inlet end section defining a downwardly opening inlet opening inclined relative to the longitudinal axis of said inlet end section and of an inside cross-sectional area at least slightly less than the cross-sectional area of the remainder of the interior of said inlet end section, said U-shaped handle and said inlet end section being disposed in substantially the same plane.

* * * * *